(12) United States Patent
Wheeler et al.

(10) Patent No.: US 9,599,137 B2
(45) Date of Patent: Mar. 21, 2017

(54) INTERNAL LOCKING MECHANISM FOR A HOLD OPEN ROD

(75) Inventors: Ryan A. Wheeler, Waco, TX (US); Julio Palma, Waco, TX (US)

(73) Assignee: MarathonNoroco Aerospace, Inc., Waco, TX (US)

( * ) Notice: Subject to any disclaimer, the term of this patent is extended or adjusted under 35 U.S.C. 154(b) by 0 days.

(21) Appl. No.: 13/345,239

(22) Filed: Jan. 6, 2012

(65) Prior Publication Data

US 2013/0175419 A1 Jul. 11, 2013

(51) Int. Cl.
| | | |
|---|---|---|
| A47F 5/00 | (2006.01) |
| E04G 25/00 | (2006.01) |
| F16M 13/00 | (2006.01) |
| F16B 7/14 | (2006.01) |
| E05C 17/02 | (2006.01) |
| F16M 11/26 | (2006.01) |
| F16M 11/00 | (2006.01) |
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16B 7/10 | (2006.01) |

(Continued)

(52) U.S. Cl.
CPC ............ F16B 7/1409 (2013.01); E05C 17/02 (2013.01); B64C 7/00 (2013.01); B64C 7/02 (2013.01); B64D 29/08 (2013.01); E04G 25/00 (2013.01); E04G 25/04 (2013.01); E04G 25/068 (2013.01); E04G 25/08 (2013.01); E05C 17/00 (2013.01); E05C 17/12 (2013.01); *E05C 17/22* (2013.01); *E05C 17/30* (2013.01); *E05F 1/00* (2013.01); *E05F 3/22* (2013.01)

(58) Field of Classification Search
CPC ......... B64D 29/08; E05C 17/30; E05C 17/00; E05C 17/02; E05C 17/12; E05C 17/206; E05C 17/22; E05F 1/00; E05F 3/22; E05F 5/00; E05F 5/022; E05F 5/025; B64C 7/00; B64C 7/02; E04G 25/00; E04G 25/04; E04G 25/068; E04G 25/08; E05D 11/1057
USPC .... 248/157, 161, 188.5, 407, 410, 688, 561, 248/636, 644, 351, 354.1, 357; 16/85, 49, 16/63, 82, 86 R; 403/104, 109.1, 322.2, 403/379.1; 244/53 R, 129.5
See application file for complete search history.

(56) References Cited

U.S. PATENT DOCUMENTS 3,469,871 A * 9/1969 Betts ..................... F16B 7/10
403/325
4,262,702 A * 4/1981 Streich ................ E02B 17/0013
138/89

(Continued)

*Primary Examiner* — Brian Mattei
*Assistant Examiner* — Taylor Morris
(74) *Attorney, Agent, or Firm* — Baker Hostetler LLP

(57) ABSTRACT

A hold open rod may include: an inner member; an outer member configured to have the inner member slide in and out of the outer member; a locking mechanism including a portion attached to the outer member and a portion attached to the inner member; a locking plug configured to move axially along an axis of the inner, outer members; a locking dog configured to move radially between a locking position and an unlocking position and a release cable operatively connected to the locking plug and configured to move the locking plug to the unlocking position. A method of actuating a lock mechanism on a hold open rod may also be provided.

17 Claims, 4 Drawing Sheets

(51) Int. Cl.
*B25G 3/18* (2006.01)
*F16B 21/00* (2006.01)
*F16D 1/00* (2006.01)
*E05F 3/00* (2006.01)
*E05F 5/02* (2006.01)
*E05F 5/06* (2006.01)
*E05F 3/22* (2006.01)
*B64C 7/00* (2006.01)
*E05C 17/00* (2006.01)
*E05C 17/30* (2006.01)
*E04G 25/04* (2006.01)
*E04G 25/06* (2006.01)
*B64C 7/02* (2006.01)
*B64D 29/08* (2006.01)
*E05F 1/00* (2006.01)
*E04G 25/08* (2006.01)
*E05C 17/12* (2006.01)
*E05C 17/22* (2006.01)

(56) References Cited

U.S. PATENT DOCUMENTS

| | | | | |
|---|---|---|---|---|
| 5,340,152 | A * | 8/1994 | Fohl | 280/805 |
| 5,366,313 | A * | 11/1994 | LaBarre | F16B 21/165 403/108 |
| 5,727,286 | A * | 3/1998 | Shen | 16/49 |
| 6,609,686 | B2 * | 8/2003 | Malizia | 248/125.8 |
| 7,204,466 | B2 * | 4/2007 | Hsieh | F16B 7/105 248/157 |
| 7,559,398 | B2 * | 7/2009 | Karlsson | 180/274 |
| 7,762,739 | B2 * | 7/2010 | Blanchard | A01B 33/028 403/322.2 |
| 2009/0324327 | A1 * | 12/2009 | McAndrews | B62J 1/08 403/409.1 |
| 2010/0024161 | A1 * | 2/2010 | Wood et al. | 16/82 |
| 2010/0307872 | A1 * | 12/2010 | Wheeler et al. | 188/67 |

* cited by examiner

INTERNAL LOCKING MECHANISM FOR A HOLD OPEN ROD

FIELD OF THE INVENTION

The present invention relates generally to hold open rods. More particularly, the present invention relates to an apparatus and method for locking and releasing the lock mechanism of a hold open rod.

BACKGROUND OF THE INVENTION

Hold open rods are well known in the both the automotive industry and the aviation industry. Hold open rods hold open a door or hatch after being opened manually or automatically. They support a considerable amount of weight, particularly in the aviation industry. It is desirable that the rods function correctly and do not malfunction in supporting this weight.

Generally the rods include two cylindrical telescoping tubes, a first tube disposed inside a second tube, an inner and outer tube, respectively. In the resting position, the inner tube is generally located almost entirely within the outer tube. The inner tube can be extended to a designated position to hold open the door or hatch. At this extended position, the tubes are locked in place, holding open the door for a period of time. Such locking prevents the inner tube from retracting into the outer tube and also permits the tubes to withstand the weight of the door or hatch. The locking mechanism can only be released by an operator.

It has been known that the locking mechanism holding the rods in the extended position can deteriorate over time. Further, in some applications, the locking mechanism that is positioned to ride along the exterior wall of the inner tube, causes grooves or indentations to be formed on the exterior wall which can be unsightly. Accordingly, it is desirable to provide an improved locking mechanism that functions over long periods of time, holds large loads and does not cause unsightly grooves on the rods.

SUMMARY OF THE INVENTION

The foregoing needs are met, to a great extent, by the present invention, wherein a hold open rod system is provided that, in some embodiments, functions over long periods of time, holds large loads and does not cause unsightly grooves on the rods.

In accordance with one embodiment of the present invention, a hold open rod may be provided. The hold open rod may include: an inner member; an outer member configured to have the inner member slide in and out of the outer member; a locking mechanism including a portion attached to the outer member and a portion attached to the inner member wherein the two portions are selectively locked to each other thereby locking the inner and outer members with respect to each other; a locking body configured to move axially along an axis of the inner, outer members and the locking mechanism to a locking and unlocking position; a locking dog configured to move radially between a locking position and an unlocking position as a result of a camming action with the locking plug as the locking plug moves axially; and a release cable operatively connected to the locking plug and configured to move the locking plug to the unlocking position when the cable is placed in tension, wherein the release cable extends outside the hold open rod.

In accordance with another embodiment of the present invention, a method of actuating a lock mechanism on a hold open rod may also be provided. The method may include: pulling on a cable and thereby: compressing a spring; moving a locking plug along an axis of the hold open rod; camming a locking dog along a slanted surface of the locking plug; moving the locking dog radially inward toward the axis; and moving the locking dog out of a locking slot.

In accordance with yet another embodiment of the present invention, a hold open rod may be provided. The hold open rod may include: an inner member; an outer member configured to have the inner member slide in and out of the outer member; a means for locking the inner member to the outer member; and a release cable operatively connected to the means for locking and configured to move the means for locking an unlocking position when the cable is placed in tension by moving a locking dog in the means for locking out of a locking slot by sliding the locking dog along a camming surface, wherein the release cable extends outside the hold open rod.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
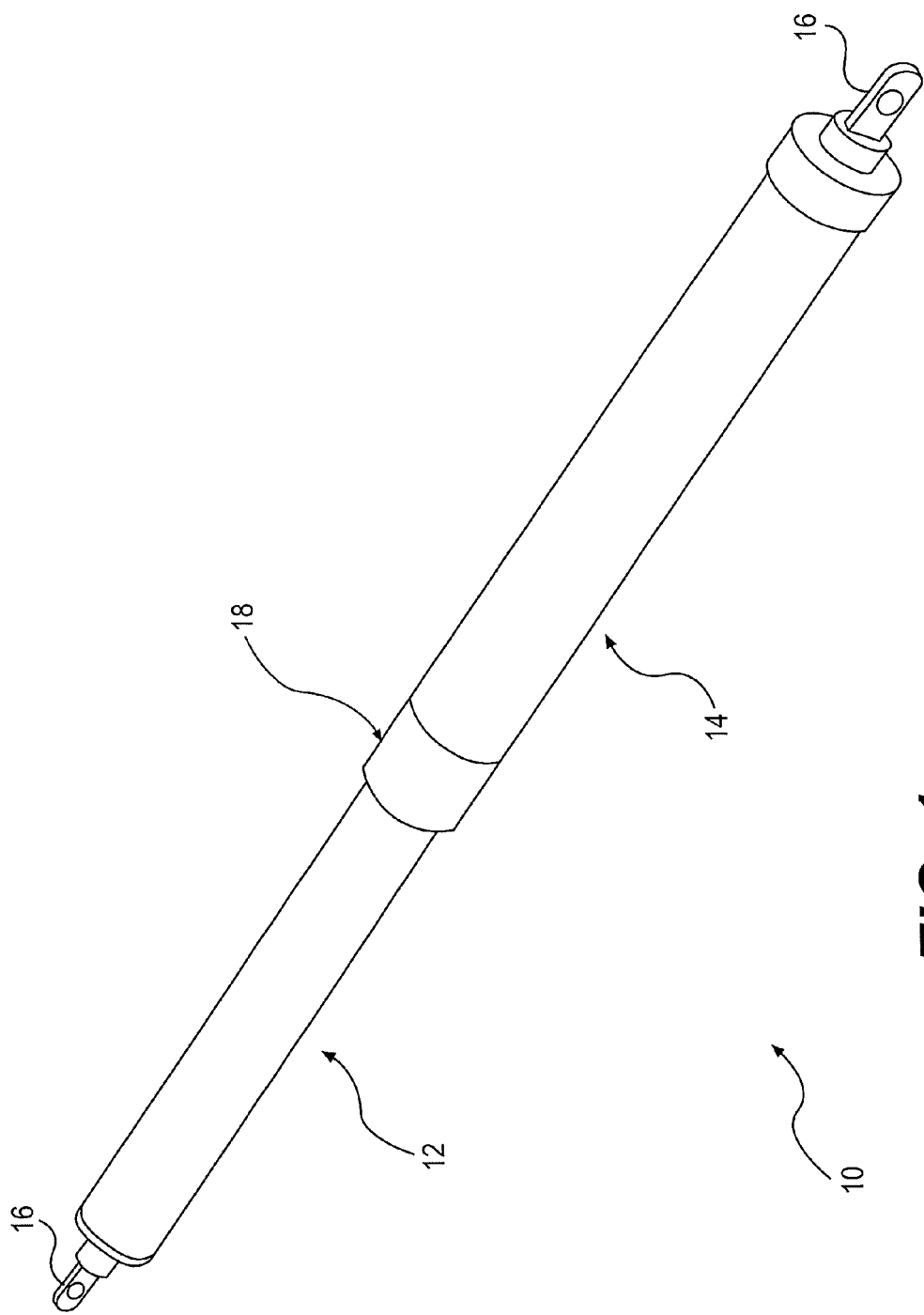
FIG. 1 is a perspective view illustrating a hold open rod according to an embodiment of the invention.

The invention will now be described with reference to the drawing figures, in which like reference numerals refer to like parts throughout. An embodiment in accordance with the present invention provides a hold open rod with a pull release system for unlocking the hold open rod.

Figure 2:
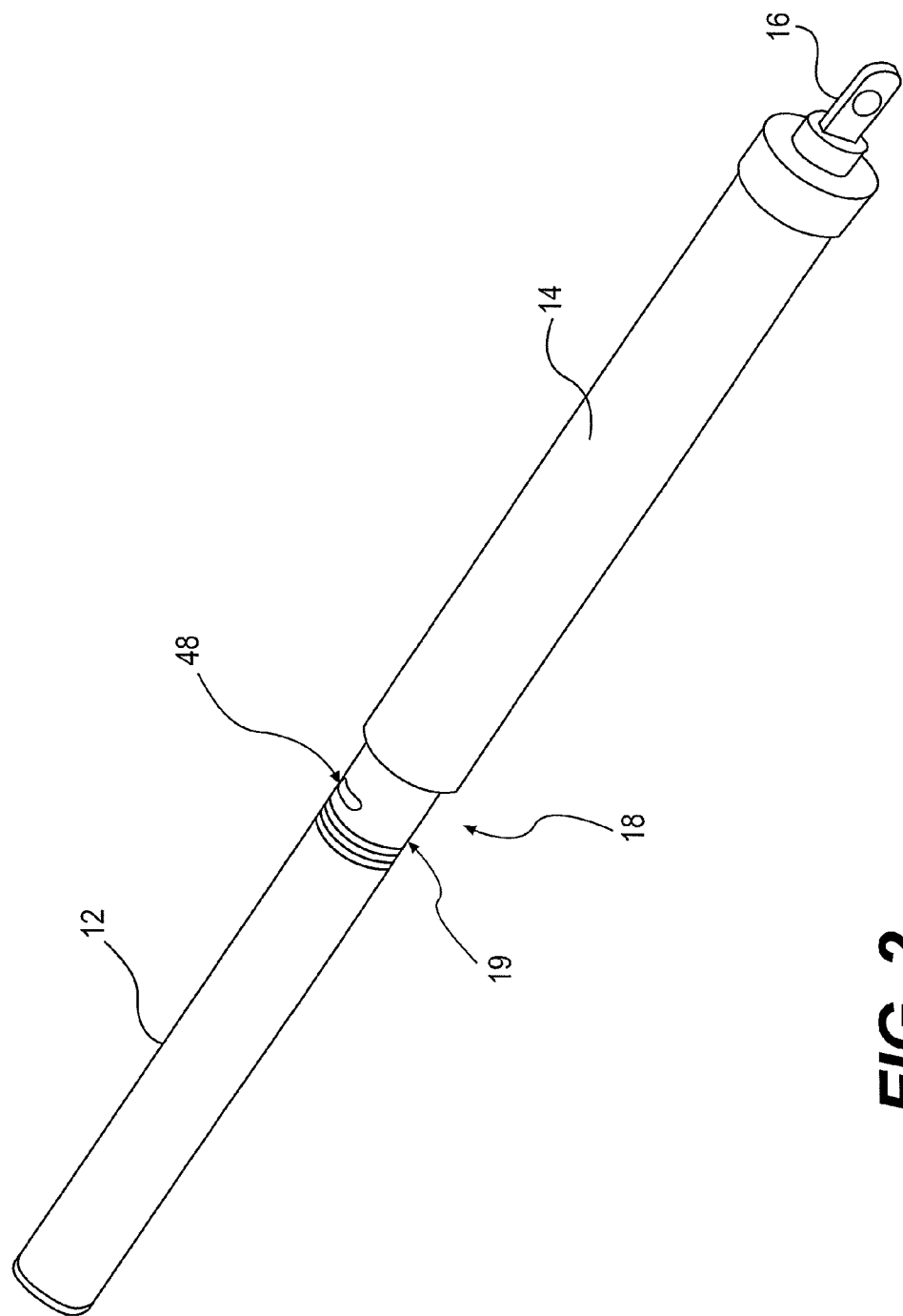
FIG. 2 is a perspective view of a hold open rod according to an embodiment of the invention where the locking mechanism has been exposed.

An embodiment of the present inventive apparatus is illustrated in FIGS. 1 and 2. A hold open rod system 10 is shown in FIGS. 1 and 2. The system 10 includes an inner tube 12 and an outer tube 14. The outer tube 14 surrounds the inner tube 12. Both ends of the hold open rod system 10 include a fastener 16 for coupling the system 10 to a particular application, for example, an aircraft door or door frame (not shown).

The inner tube 12 is capable of sliding into the outer tube 14 to shorten the length of the hold open rod system such as when a door or hatch is shut. Then when the door or hatch is open, the inner tube 12 slides out of the outer tube 14. To lock the inner tube 12 with respect to the outer tube 14, a locking mechanism 18 provided.

In FIG. 2, the locking mechanism 18 is exposed. The outer wall 24 has been removed to reveal the locking body 19 and the locking dogs 48. The locking mechanism will be described in more detail with respect to FIGS. 3 and 4.

Figure 3:
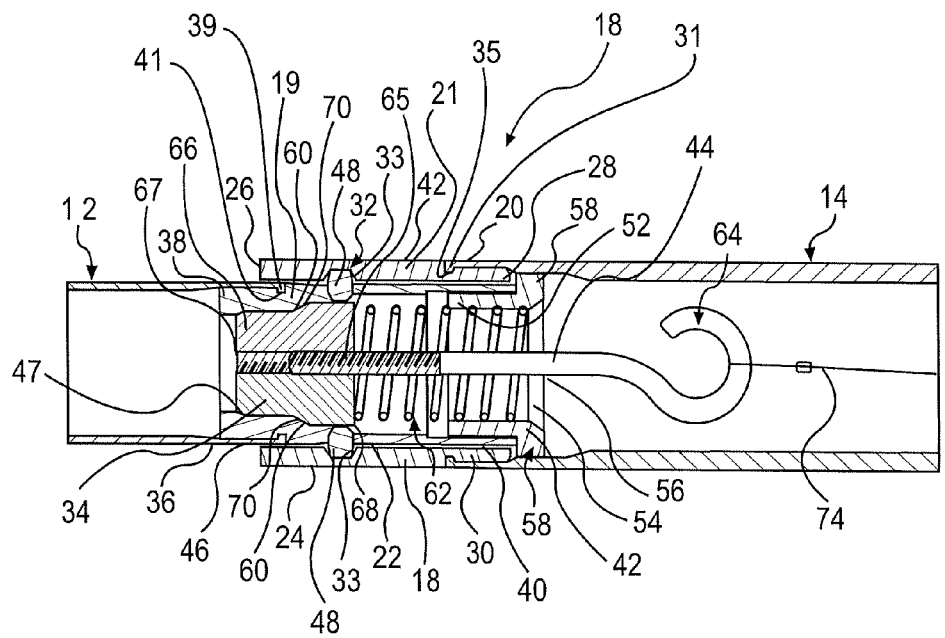
FIG. 3 is a cross-sectional view of the locking mechanism and the hold open rod where the locking mechanism is in a locking position.

FIG. 3 is a cross-sectional view of the locking mechanism 18 showing how the inner tube 12 and outer tube 14 attach to the locking mechanism 18. The locking mechanism 18 shown in FIG. 3 is shown in a locked position. This is in contrast to FIG. 4, which shows a cross-sectional view of the locking mechanism 18 in a unlocked position. As shown in FIG. 3 a first end 20 of the outer tube 14 is attached to an outer housing 21 of the locking mechanism 18. The locking mechanism 18 may be made of metal such as aluminum, steel or any other suitable substance. The inner 12 and outer tubes 14 may also be made of metal such as aluminum or steel or, in other embodiments of the invention, may be made of composite materials such as carbon fiber or any other suitable substances.

The outer tube 14 may attach to the outer housing 21 of the locking mechanism 18 via threads, press fit, fasteners, an epoxy or other adhesive, or any other suitable substance.

The outer housing 21 or locking mechanism 18 has an inner wall 22 and an outer wall 24. The outer wall 24 of the outer housing 21 is exposed to outside environment whereas the inner wall 22 is exposed to internal components of the locking mechanism 18. The outer tube 14 attaches to the outer housing 21 of the locking mechanism 18 at a second end 28 of the outer housing 21 of the locking mechanism 18. The first end 26 of the outer housing 21 of the locking mechanism 18 does not attach to the inner tube 12, rather the first end 26 of the outer housing 21 of the locking mechanism 18 does not butt against any structure but is exposed to the outside environment. The second end 28 of the outer housing 21 has a reduced diameter portion 30 which assists in attaching the outer housing 21 to the first end 20 of the outer tube 14. The reduced diameter portion 30 fits inside a end wall portion 20 of the outer tube 14 and may be attached to the outer tube 14 in any number of ways. For example, the reduced diameter portion may be attached to the outer tube 14 by threads, a press fit, fasteners, an adhesive or any other suitable means. In the embodiment shown in FIG. 3, the outer housing 21 attaches to the outer tube 14 by projections 31 in the outer tube 14 fit into a groove 35 in the outer housing 21 of the locking mechanism 18.

The inner wall 22 of the outer housing 21 is equipped with a locking groove 32. The locking groove 32 has an angled portion 33 which may act as a camming surface for moving the locking dogs 48. When the locking dogs 48 are in the locking groove 32, the locking dogs 48 are in the locking position. The locking mechanism 18 also includes a locking plug 34 as shown in FIG. 3. The locking plug 34 secures the locking dogs 48 into the locking groove 32 when the locking plug 34 is in a locking position.

An end 36 of the inner tube 12 attaches to a first end 38 of the locking body 19 similar to the way the first end 20 of the outer tube 14 attaches to the second end 28 of the outer housing 21 of the locking mechanism 18. The second end 36 of the inner tube 12 may attach to the first end 38 of the locking body 19 via threads, fasteners, an adhesive, a press fit or any other suitable means of attachment.

As shown in FIG. 3, a projection 39 fits into a groove 41 in the locking body 19. In some embodiments of the invention, the inner tube 12 may be made of metal, such as aluminum or steel, or of a composite material such as, for example, but not limited to, carbon fiber. The locking body 19 may be made of metal such as aluminum or steel or any other suitable metal or material.

A stop 42 is attached to the second end 40 of the locking body 19. The stop 42 provides a surface for a spring 62 to urge against. The spring 62 urges against the locking plug 34 at one end and the stop 42 at the other end. The stop 42 may be attached to the second end 40 of the locking body 19 via threads, a press fit, an adhesive or any other suitable means for attaching a stop 42 to the second end 40 of the locking body 19. The stop 42 includes an open end 52 into which the spring 62 extends, and a closed end 54. The closed end 54 provides the surface for the spring 62 to urge against. An opening 56 in a closed end 54 provides a pathway for the shaft 44 of the hook 64 to pass through the stop 42. The stop 42 also includes a flange 58 which may provide a surface for the second end 40 of the locking body 19 to butt against.

The spring 62 biases the locking plug 34 to a position in the direction of the inner tube 12, as shown in FIG. 3. The angled wall 70 of the locking plug 34 butts against the stop surface 60 of the locking body 19. The stop surface 60 prevents the locking plug 34 from extending any further toward the inner tube 12. The hook 64 is attached to the locking plug 34 via threads 65 on part of the shaft 44 and a threaded hole 67 in the locking plug 34. The hook 64 could be attached to the locking plug 34 in any manner of ways such as press fit, welding, an epoxy, fasteners or any other suitable way of fasting the hook 64 to the locking body 34.

Because the spring 62 biases the locking body 34 to the left as shown in FIG. 3, the hook 64 is also biased or moved to the left 64 by the spring 62. When the locking plug 34 is moved to the left towards the inner tube 12 as shown in FIG. 3, the locking dogs 48 are forced into the locking groove 32. The locking dogs 48 cause the outer tube 14 to be fixed or locked with respect to the inner tube 12. When the locking plug 34 is in the locking position as shown in FIG. 3, the first end 66 of the locking plug 34 extends through the first end 38 of the locking body as shown in FIG. 3.

In order for the locking mechanism 18 to be in the locking position as shown in FIG. 3, tension on the cable 74 attached to the hook 64 must be slack or at least not significant enough to overcome the force of the spring 62. When the tensile force in the cable 74 is greater than this force of the spring 62, then the spring 62 will compress and the locking mechanism 18 will move to an unlocking position as shown in FIG. 4.

Figure 4:
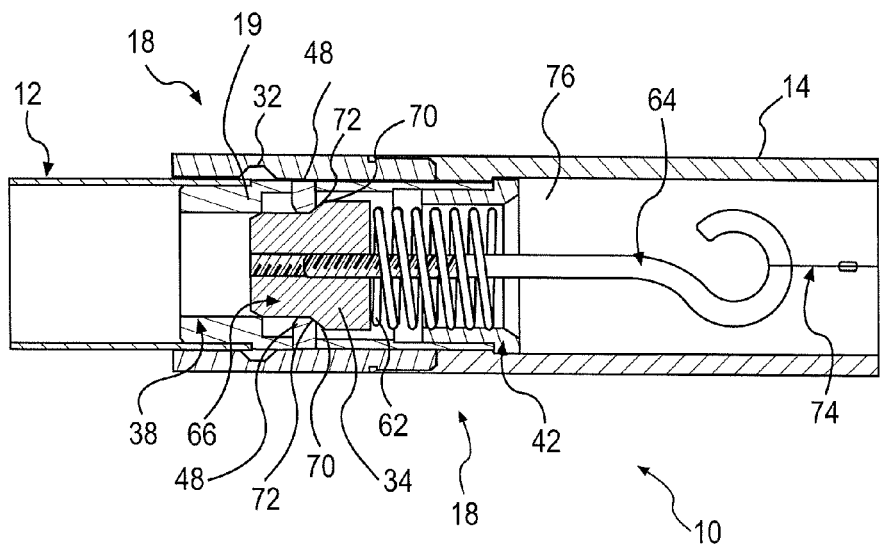
FIG. 4 is a cross-sectional view of the locking mechanism where the hold open rod or the locking mechanism is in an unlocked position.

In FIG. 4, the cable 74 has moved the hook 64 to the right, or in other words, towards the outer tube 14. Because the hook 64 and the locking plug 34 are connected to each other, the locking plug 34 is also moved to the right. The spring 62 has become compressed between the locking plug 34 and the stop 40. Because the locking plug 34 has moved to the right, the first end 66 of the locking plug 34 could also move to the right and out of the first end 38 of the locking body 19. The reduced diameter of the first end 66 of the locking plug 34 has permitted the locking dogs 48 to move radially inward. The angled wall 70 of the locking plug 34 has provided a camming surface for the angled portion 72 of locking dogs 48 to move radially inwardly along. This movement caused the locking dogs 48 to move out of the locking groove 32.

Once the locking dog 48 has moved out of the locking groove 32, the outer tube 14 and the inner tube 12 are no longer locked together. Continued tension on the cable 74 permits the inner tube 12 to move with the locking body 19 into the interior 76 of the outer tube 14 as shown. Thus, when the locking mechanism 18 is in the unlocked position, as shown in FIG. 4, the inner tube 12 is free to move into the interior 76 of the outer tube 14, thereby collapsing the hold open rod 10. Moving the interior inner tube 12 into the outer tube 14 allows a door or hatch to which the hold open rod 10 is attached to move to a closed position.

Just as the locking mechanism 18 has been described as moving from a locked position to an unlocked position, the locking mechanism 18 can also move from an unlocked position as shown in FIG. 4 to the locked position as shown in FIG. 3. By decreasing or releasing the tension on the cable 74, the outer tube 12 can be pulled out of the inner tube 14. This may also be done by moving the door (not shown) to which the hold open rod is attached to an open position. Further opening of the door may cause the spring 62 to urge the locking plug 34 away from the stop 42. Moving the locking plug 34 away from the stop 42 may cause the angled wall 70 of the locking plug 34 to act as a camming surface against the angled portion 72 of the locking dogs 48. As the locking dogs 48 align with the locking groove 32, the camming action between the angled wall 70 of the locking plug 34 and the angled portion 72 of locking dogs 48 will push the locking dogs 48 into the locking groove 32. This will lock the outer tube 14 to the inner tube 12. Once the outer tube 14 has been locked to the inner tube 12, the inner tube 12, can no longer move further in or further out of the interior 76 of the inner tube 14.

Figure 5:
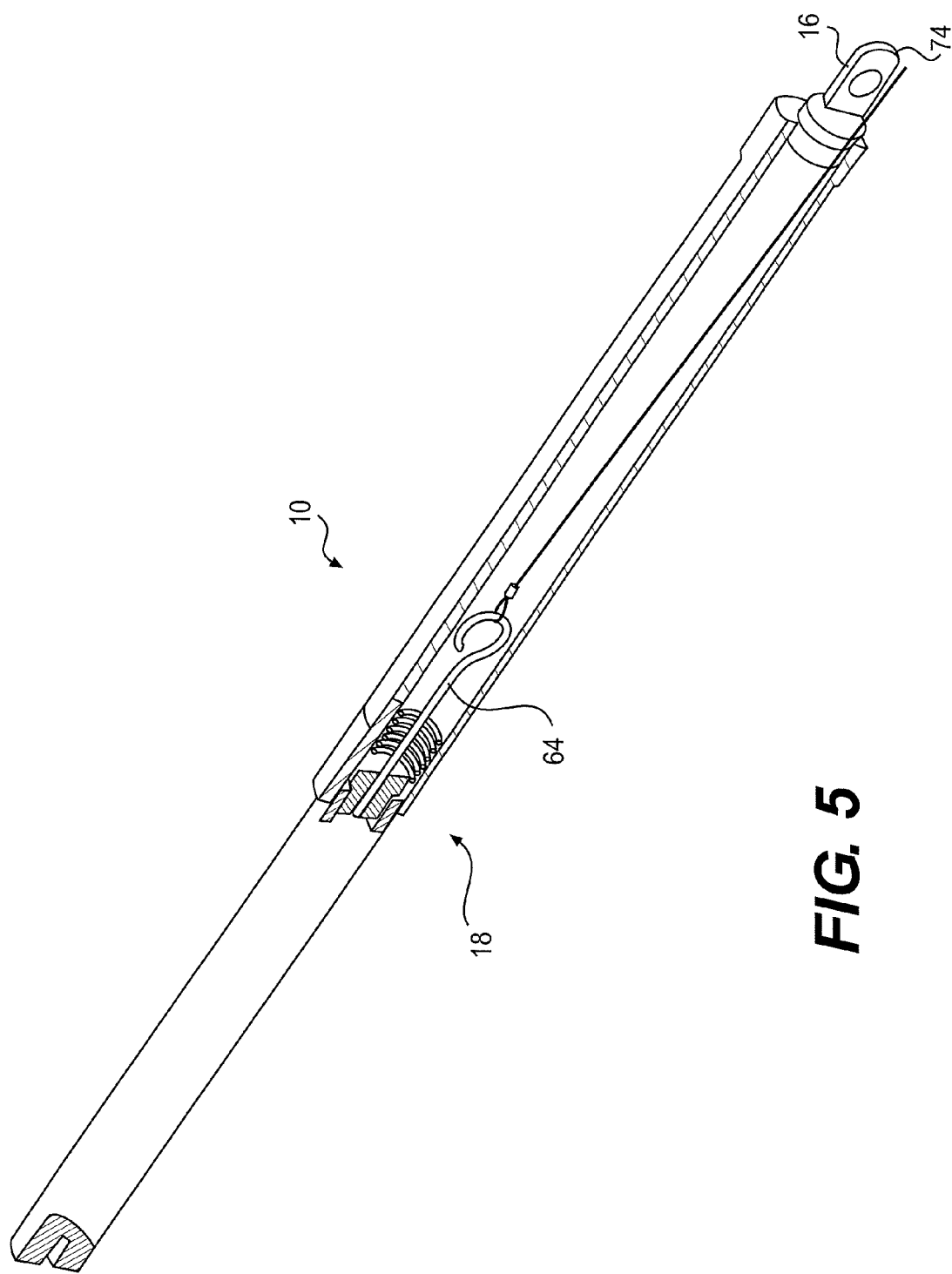
FIG. 5 is a cross-sectional view of the hold open rod.

FIG. 5 is a cut away view of the hold open rod 10 showing the release cable 74 attached to the hook 64 of the locking mechanism 18. The fastener 16 of the hold open rod 10 is also shown. FIG. 5 allows perspective of the locking mechanism 18 to be seen with respect to the hold open rod 10 as a whole. The release cable 74 extends to outside of the hold open rod 10. This allows a user to pull on the release cable 74 where it is desired to unlock the locking mechanism 18. In some embodiments, the release cable 74 may be terminated with pull handle or other structure that will make the release cable easier to manipulate.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hold open rod comprising:
   an inner member;
   an outer member configured to have the inner member slide in and out of the outer member;
   a locking mechanism including a portion attached to the outer member and a portion attached to the inner member wherein the two portions are selectively locked to each other thereby locking the inner and outer members with respect to each other, wherein the portion attached to the inner member is at least partially arranged inside the inner member;
   the portion of the locking mechanism attached to the outer member being attached to an open end of the outer member and extending axially from the open end of the outer member;
   a locking plug configured to move axially along an axis of and with respect to the inner member, the outer member and the locking mechanism to a locking and unlocking position, wherein the locking plug is at least partially arranged inside the portion attached to the inner member and wherein the locking plug is arranged in the portion extending axially from the open end of the outer member when in the locking position;
   a locking dog configured to move radially between a locking position, where the locking dog is forced into an internal groove in the portion of the locking mechanism attached to the outer member as a result of a camming action with the locking plug as the locking plug moves axially, and an unlocking position;
   a release mechanism operatively connected to the locking plug and configured to move the locking plug to the unlocking position when the release mechanism is placed in tension; and
   a spring biasing the locking plug to the locking position when the internal groove of the outer member and the locking dog are co-positioned to allow locking;
   wherein the release mechanism comprises a cable configured to compress the spring to move the locking plug to a position placing the locking dog in the unlocking position, and
   wherein the release mechanism extends outside the outer member.

2. The hold open rod of claim 1, wherein the release mechanism overcomes the bias of the spring when sufficient force is applied to the cable of the release mechanism.

3. The hold open rod of claim 2,
   wherein the spring exerts a sufficient force upon the locking plug to move the locking plug to a locking position when there is substantially no tensile force carried by the release mechanism and the locking dog is at least one of positioned and aligned with the internal groove; and
   wherein the spring is partially arranged in the portion extending axially from the open end of the outer member when the locking dog is in the locking position.

4. The hold open rod of claim 1,
   wherein the locking dog has an angled inner surface that slides along an angled surface on the locking plug to move the locking dog radially to the axis of the inner member to a locking position by a spring force when the locking dog is at least one of aligned and positioned with the internal groove in the outer member; and
   wherein the internal groove comprises angled portions configured to act as a camming surface for the locking dog.

5. The hold open rod of claim 1,
   wherein the locking dog comprises a plurality of locking dogs; and
   wherein the locking dog is arranged in the portion extending axially from the open end of the outer member when the locking dog is in the locking position.

6. The hold open rod of claim 1, comprising a fastener arranged on at least one end of the hold open rod for attaching the hold open rod to a door or hatch.

7. The hold open rod of claim 1, wherein the hold open rod is attached to a door or hatch in an aircraft.

8. The hold open rod of claim 1, wherein at least one component of the rod comprises a composite material.

9. The hold open rod of claim 1, wherein the internal groove is arranged in the portion extending axially from the open end of the outer member.

10. A hold open rod comprising:
an inner member;
an outer member configured to have the inner member slide in and out of the outer member;
a locking mechanism including a portion attached to and extending from an end of the outer member and a portion attached to and extending from an end of the inner member wherein the two portions are selectively locked to each other thereby locking the inner and outer members with respect to each other, wherein the portion attached to the inner member is at least partially arranged inside the inner member;
the portion of the locking mechanism attached to the outer member being attached to an open end of the outer member and extending axially from the open end of the outer member;
a locking plug configured to move axially along an axis of and with respect to the inner member, the outer member and the locking mechanism to a locking and unlocking position, wherein the locking plug is at least partially arranged inside the portion attached to the inner member and wherein the locking plug is arranged in the portion extending axially from the open end of the outer member when in the locking position;
a locking dog configured to move radially between a locking position, where the locking dog is forced into an internal groove in the portion of the locking mechanism attached to the outer member as a result of a camming action with the locking plug as the locking plug moves axially, and an unlocking position;
a release mechanism operatively connected to the locking plug and configured to move the locking plug to the unlocking position when the release mechanism is placed in tension;
a spring biasing the locking plug to the locking position when the internal groove of the outer member and the locking dog are co-positioned to allow locking;
wherein the release mechanism comprises a cable configured to compress the spring to move the locking plug to a position placing the locking dog in the unlocking position, and
wherein the release mechanism extends outside the outer member.

11. The hold open rod of claim 10, wherein the release mechanism overcomes the bias of the spring when sufficient force is applied to the cable of the release mechanism.

12. The hold open rod of claim 11,
wherein the spring exerts a sufficient force upon the locking plug to move the locking plug to a locking position when there is substantially no tensile force carried by the release mechanism and the locking dog is at least one of positioned and aligned with the internal groove; and
wherein the spring is partially arranged in the portion extending axially from the open end of the outer member when the locking dog is in the locking position.

13. The hold open rod of claim 10,
wherein the locking dog has an angled inner surface that slides along an angled surface on the locking plug to move the locking dog radially to the axis of the inner member to a locking position by a spring force when the locking dog is at least one of aligned and positioned with the internal groove in the outer member; and
wherein the internal groove comprises angled portions configured to act as a camming surface for the locking dog.

14. The hold open rod of claim 10,
wherein the locking dog comprises a plurality of locking dogs; and
wherein the locking dog is arranged in the portion extending axially from the open end of the outer member when the locking dog is in the locking position.

15. The hold open rod of claim 10, wherein the hold open rod is attached to a door or hatch in an aircraft.

16. The hold open rod of claim 10, wherein at least one component of the rod comprises a composite material.

17. The hold open rod of claim 10, wherein the internal groove is arranged in the portion extending axially from the open end of the outer member.

* * * * *